United States Patent Office 3,222,373
Patented Dec. 7, 1965

3,222,373
DERIVATIVES OF FERROCENE
Charanjit Rai, Crystal Lake, Ill., assignor, by mesne assignments, to Union Oil Company of California, Los Angeles, Calif., a corporation of California
No Drawing. Filed June 6, 1963, Ser. No. 285,866
12 Claims. (Cl. 260—299)

This invention relates to and has as its objectives a new class of ferrocene derivatives comprising arylthiazolyl alkyl ferrocenes, aryloxazolylalkyl ferrocenes and arylimidazolylalkyl ferrocenes; the corresponding bis-compounds, arylthiazolylaryl ferrocenes, aryloxazolylaryl ferrocenes, arylimidazolylaryl ferrocenes; and the corresponding bis-compounds, represented by the formula:

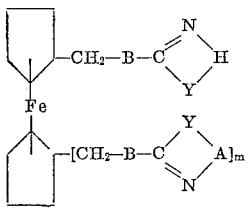

wherein B is a substituent of the group consisting of a divalent alkylene radical having 1 to 10 carbon atoms, and a divalent aromatic nucleus of 6 to 14 carbon atoms, Y is a member of the group of oxygen, sulfur and imino (=NH), A is a divalent vicinal aromatic nucleus of 6 to 14 carbon atoms in the cyclic portion and lower alkyl-, lower alkoxy-, chloro-, and fluoro-substituted forms thereof and $m$ is 0 or 1.

The process of this invention, and a further object to prepare the foregoing ferrocene derivatives, comprises the steps of (1) acylating ferrocene with an alkyl or aryl anhydride to form the keto acid:

(1)

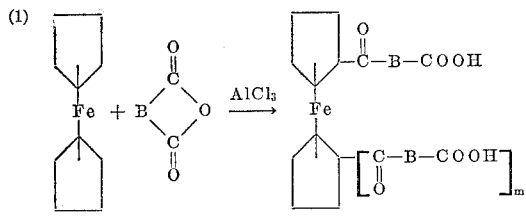

(2) reducing the resulting geto acid to the corresponding monocarboxylic or dicarboxylic acid:

(2)

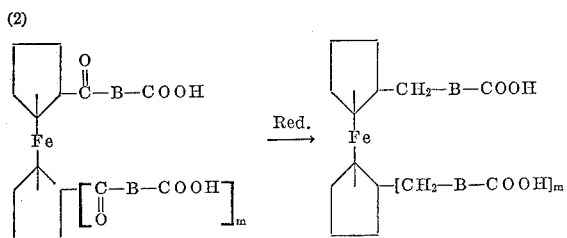

and (3) condensing the resulting mono or polycarboxylic acid with an o-hydroxy, o-mercapto, or o-aminoaryl amine in the presence of polyphosphoric acid as the catalyst and, preferably as the reaction solvent:

(3)

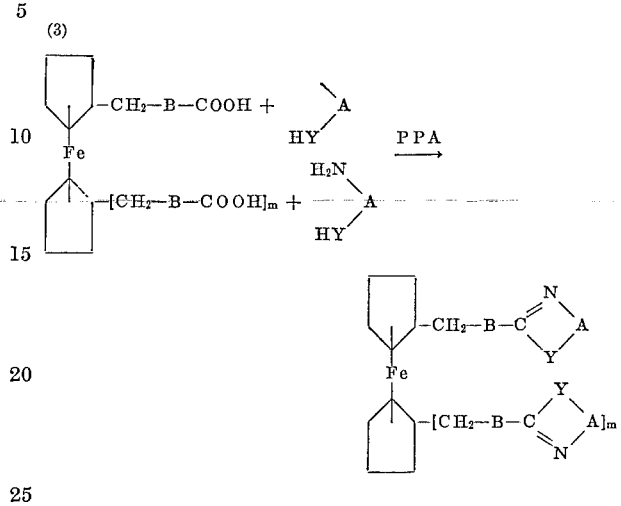

wherein A, B, and $m$ are as heretofore defined, and Y is O, S or NH. These and further objects and features of this invention will be described as the specification proceeds.

In order to demonstrate the invention, the following examples are given:

*Example I*

This invention has been demonstrated experimentally by the preparation of 1-[2-benzothiazolyl)propyl] ferrocene, as follows:

β-Ferrocenoylpropionic acid was prepared first by charging 9.29 g. of ferrocene and 11 g. of succinic anhydride to a three-necked flask (equipped with stirrer) and then slowly adding 200 cc. of methylene chloride and 11.6 g. of aluminum chloride. After the reaction mixture had been stirred for about two hours, it was poured onto ice, and the resulting mixture was extracted with ethylene dichloride. Next, the extract phase was washed with sodium carbonate, filtered through Celite, treated with dilute hydrochloric acid, and dried. The product, which weighed 4 grams, had a melting point of 168° C.

The resulting β-ferrocenoylpropionic acid was hydrogenated in 250 cc. of glacial acetic acid, over 850 mg. of platinum oxide, by maintaining the mixture under hydrogen at a pressure of 30 p.s.i.g. for 48 hours. The product was worked up in conventional fashion by dilution with water, extraction with ether, washing the ether extract several times with water, and extraction with sodium carbonate solution. The alkaline extract was acidified to yield 3.45 g. of γ-ferrocenylbutyric acid having a melting point of 116° C.

Finally, 50 g. of polyphosphoric acid were placed in a three-necked flask (fitted with stirrer) and heated to 100° C., after which 2.72 g. of the γ-ferrocenylbutyric acid and 1.5 g. of o-aminothiophenol were added slowly. After the mixture had been heated and stirred for about two hours, it was cooled and poured into ice, and the mixture was filtered. The filtered solid product was washed with sodium bicarbonate solution and then with water, and finally was dried. The 1-(2-benzothiazolyl) propyl ferrocene product weighed 2.5 g. and had a melting point of 108° C.

Example II

The preparation of 1-(2benzothiazolyl)butyl ferrocene β-ferrocenylbutyric acid is prepared first by reacting about 10 g. of ferrocene and 11 g. of glutaric acid anhydride to a three-necked flask as described in Example 1. The resulting β-ferrocenylbutyric acid is hydrogenated and worked up as in Example I to yield about 3.2 g. of γ-ferrocenylvaleric acid which is reacted with o-aminothiophenol in the presence of polyphosphoric acid to produce 1-(2-benzothiazolyl)butyl ferrocene.

Example III

The preparation of 1 - (2 - benzimidazolyl)propyl ferrocene.

The process of Example I is repeated to prepare γ-ferrocenylbutyric acid, which is reacted with o-phenylenediamine in the presence of polyphosphoric acid.

Acids and their anhydrides that can be used for step (1) of the reaction to prepare the keto acid include:

Maleic anhydride
Succinic acid
Succinic acid anhydride
Glutaric acid
Glutaric acid anhydride
Adipic acid
Adipic acid anhydride
Pimelic acid
Pimelic acid anhydride
Suberic acid
Suberic acid anhydride
Azelaic acid
Azelaic acid anhydride
Sebacic acid
Sebacic acid anhydride
Fumaric acid
Fumaric acid anhydride
Chloromaleic acid
Chloromaleic acid anhydride
Citraconic acid
Citraconic acid anhydride
Phthalic acid or anhydride
Terephthalic acid The arylamines coming within the scope of this invention are illustrated by, but not limited to:

o-Aminothiophenol
o-Diaminobenzene
1-methyl-2,3-diaminobenzene
1-ethoxy-2,3-diaminobenzene
1,2-diaminonaphthalene
2,3-diaminonaphthalene
1-propyl-3,4-diaminonaphthalene
2-amino-3-mercaptonaphthalene
1-octyl-2-amino,3-mercaptonaphthalene
2-amino-3-hydroxynaphthalene
1-nonyl-2-amino,3-hydroxynaphthalene
1-epicosyl-2-hydroxy,3-aminonaphthalene
2-amino-3-hydroxyanthracene
1-tetradecyl-2-amino,3-hydroxyanthracene
1-propoxy-2,3-diaminobenzene
4-butoxy-2,3-diaminobenzene
5-decyl-2,3-diaminobenzene
5-dodecyl-2,3-diaminobenzene
5-undecyl-2,3-diaminobenzene
5-cyclopropyl-2,3-diaminobenzene
5-cyclopentyl-2,3-diaminobenzene
5-cyclohexyl-2,3-diaminobenzene
6-cyclohexyl-1,2-diaminonaphthalene
6-decyl-2-amino,3-mercaptonaphthalene
6-dodecyl-2-amino-3-mercaptonaphthalene
6-heptyl-2-amino-3-mercaptonaphthalene
7-tridecyl-2-hydroxy-3-aminonaphthalene
5-tetradecyl-2-hydroxy-3-aminobenzene Species of compounds prepared and coming within the scope of the invention are:

1-(2-benzothiazolyl)butyl ferrocene
1-(2-benzothiazolyl)pentyl ferrocene
1-(2-benzothiazolyl)octyl ferrocene
1-(2-benzothiazolyl)-4-chlorohexyl ferrocene
1-(2-benzoxazolyl)-phenyl ferrocene
1-(2-benzoxazolyl)-o-phenylene ferrocene
1-(2-benzoxazolyl)-p-phenylene ferrocene
1-(2-benzoxazolyl)-naphthyl ferrocene
1-(2-benzothiazolyl)butyl ferrocene
1-(2-benzoxazolyl)pentyl ferrocene
1-(2-benzoxazolyl)eicosyl ferrocene
1-(2-benzimidazolyl)nonyl ferrocene
Bis-(-naphthoxazolyl)butyl ferrocene
Bis-(-naphthimidazolyl)phenyl ferrocene
Bis-(-anthroxazolyl)decyl ferrocene
1-(2-anthrimidazolyl)-naphthyl ferrocene The polyphosphoric acid which is used as the catalyst for the last step of the reaction is a commercial product consisting of a liquid mixture of polymeric phosphoric acids having a $P_2O_5$ content in the range of about 72 to 90% and preferably about 82 to 84%. Such acid and its preparation is described in U.S. Patent 2,999,010.

The compounds of this invention have utility as scintillating agents and ultraviolet light absorbers.

The embodiments of this invention in which an exclusive property or privilege is claimed are defined as follows:

1. A compound of the formula

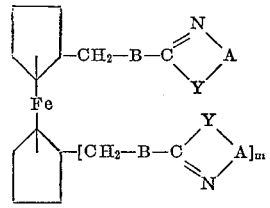

wherein B is a substituent of the group consisting of $C_1$ to $C_{10}$ alkylene and arylene of 6 to 14 cyclic carbon atoms, Y is a substituent of the group consisting of oxygen, sulfur, and imino, A is a substituent of the group consisting of vicinal arylene of 6 to 14 cyclic carbon atoms, $C_1$ to $C_{20}$ alkyl-substituted vicinal arylene of 6 to 14 cyclic carbon atoms, $C_1$ to $C_4$ alkoxy-substituted vicinal arylene of 6 to 14 cyclic carbon atoms, chloro-substituted vicinal arylene of 6 to 14 cyclic carbon atoms and fluoro-substituted vicinal arylene of 6 to 14 cyclic carbon atoms and $m$ is 0 to 1.

2. A compound in accordance with claim 1 in which B is $C_1$ to $C_{10}$ alkylene, Y is oxygen, A is vicinal arylene of 6 to 14 cyclic carbon atoms and $m$ is 0.

3. A compound in accordance with claim 1 in which B is arylene of 6 to 14 cyclic carbon atoms, Y is oxygen, A is vicinal arylene of 6 to 14 cyclic carbon atoms and $m$ is 0.

4. A compound in accordance with claim 1 in which B is alkylene of 1 to 10 carbon atoms, Y is sulfur, A is vicinal arylene of 6 to 14 cyclic carbon atoms and $m$ is 0.

5. A compound in accordance with claim 1 in which B is alkylene of 1 to 10 carbon atoms, Y is imino, A is vicinal arylene of 6 to 14 cyclic carbon atoms and $m$ is 0.

6. A compound in accordance with claim 1 in which B is arylene of 6 to 14 cyclic carbon atoms, Y is sulfur, A is vicinal arylene of 6 to 14 cyclic carbon atoms and $m$ is 0.

7. A compound in accordance with claim 1 in which B is arylene of 6 to 14 cyclic carbon atoms, Y is imino, A is vicinal arylene of 6 to 14 carbon atoms and $m$ is 0.

8. 1-(2-benzothiazolyl)propyl ferrocene.
9. 1-(2-benzothiazolyl)butyl ferrocene.
10. 1-(2-benzimidazolyl)propyl ferrocene.
11. 1-(2-benzoxazolyl)-o-phenylene ferrocene.
12. 1-(2-benzoxazolyl)-p-phenylene ferrocene.

References Cited by the Examiner

UNITED STATES PATENTS 2,985,661   5/1961   Hein et al. _____ 260—307.4

OTHER REFERENCES

Fieser et al., Advanced Organic Chemistry (New York, 1961), pages 904–928.

NICHOLAS S. RIZZO, *Primary Examiner.*